Figure 1:
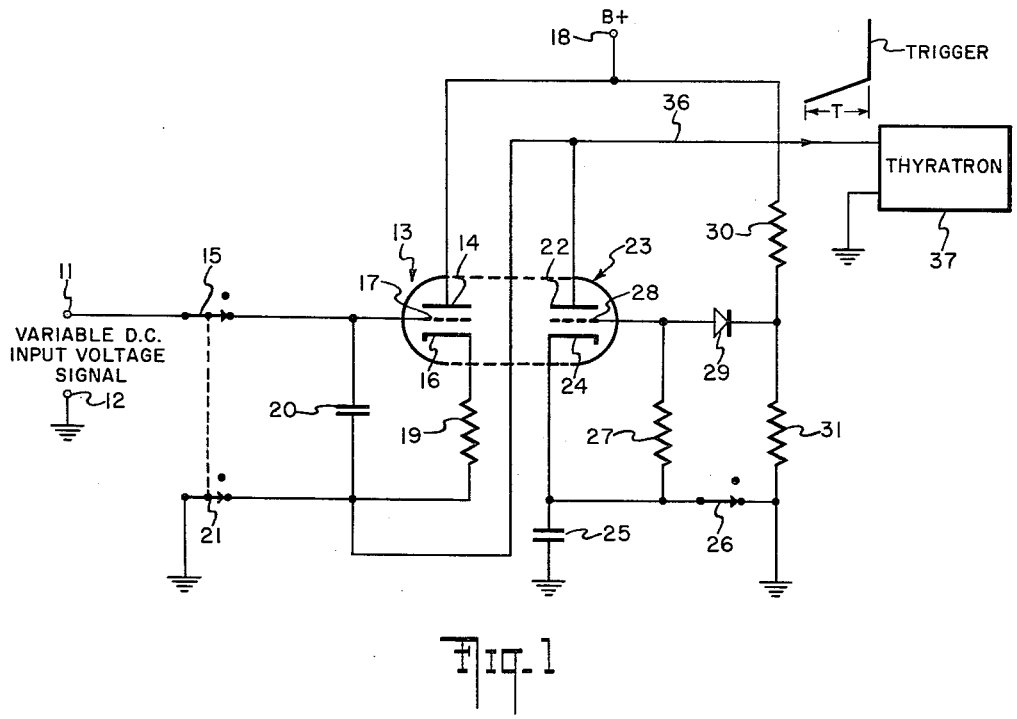

Aug. 14, 1962 R. L. ZINKE 3,049,672
VOLTAGE GENERATING CIRCUIT HAVING AN OUTPUT TRIGGER VOLTAGE
THAT RISES ABRUPTLY AT A PREDETERMINED TIME
Filed Oct. 20, 1958

INVENTOR
ROBERT L. ZINKE
BY
ATTORNEY

United States Patent Office 3,049,672
Patented Aug. 14, 1962

3,049,672
VOLTAGE GENERATING CIRCUIT HAVING AN OUTPUT TRIGGER VOLTAGE THAT RISES ABRUPTLY AT A PREDETERMINED TIME
Robert L. Zinke, East Northport, N.Y., assignor to Sperry Rand Corporation, Great Neck, N.Y., a corporation of Delaware
Filed Oct. 20, 1958, Ser. No. 768,165
12 Claims. (Cl. 328—178)

The present invention relates to voltage generating circuits. More particularly, it is concerned with a circuit for providing a trigger voltage that rises abruptly at the end of a time interval following the occurrence of a certain event.

It is sometimes required to trigger a voltage sensitive device such as a thyratron at the end of a time interval following an event such as the opening of a switch. It may also be required that this time interval be a function of the magnitude of an input voltage signal. This could be done by providing a circuit for supplying a sweep voltage waveform to the trigger input lead of the thyratron, where the slope of the sweep is a function of the magnitude of the input signal.

However, the firing potential of a thyratron is unstable. Therefore, the time required for an input sweep voltage to rise to the firing potential is a function of variations in this potential as well as the slope of the sweep. Consequently, it has heretofore been extremely difficult to trigger such a device at a time that is dependent on the magnitude of an input voltage signal and independent of variations in the firing potential.

Therefore, it is an object of the present invention to provide a circuit for generating a trigger voltage that rises abruptly precisely at the end of a time interval following the occurrence of a certain event, this time interval being an accurate function of the magnitude of an input voltage signal.

It is a further object to provide a circuit for generating such a trigger voltage for firing a voltage sensitive device at a time which is independent of variations in the firing potential of the device.

It is another object to provide a circuit for generating a voltage waveform which gradually rises for a certain time interval dependent on the magnitude of an input signal.

It is still another object to provide such a circuit wherein the voltage waveform gradually rises at a substantially constant rate for a predetermined time interval, and then rises abruptly at the end of this time interval.

Figure 2:
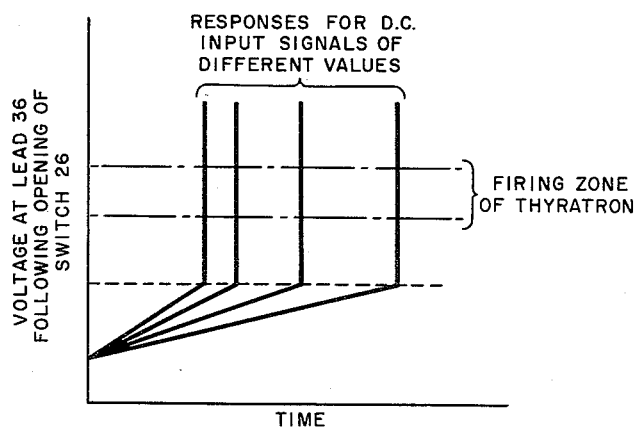

Generally, the foregoing and other objects of the invention are attained by charging a capacitor with a substantially constant current through a path including first and second electron devices each having a current controlling electrode. Means are connected to the control electrode of one device for controlling the magnitude of the charging current as a function of an input signal. Further means are connected to the control electrode of the other device for substantially cutting off current flow therethrough when the voltage across the capacitor rises to a predetermined value. The details of the invention will become more apparent from the following description and the accompanying drawings wherein:

FIG. 1 is a diagram of a trigger voltage generating circuit provided in accordance with the present invention; and FIG. 2 is a plot of several waveforms appearing at the output lead of the circuit shown in FIG. 1.

Referring now to FIG. 1, the numerals 11 and 12 refer to a pair of input terminals for receiving a variable D.-C. voltage signal, terminal 12 being connected to ground. A switch 15 connects terminal 11 to a control grid electrode 17 of a first electron device such as a triode 13 having an anode 14 and a cathode 16. The anode 14 is connected to a terminal 18 for receiving a B+ supply voltage. The cathode 16 is connected back to the control grid 17 by a resistor 19 and a capacitor 20. The junction between resistor 19 and capacitor 20 is connected to ground by a switch 21 that is ganged to the switch 15, for example.

The junction between the capacitor 20 and resistor 19 is also connected to the anode 22 of a second electron device such as a triode 23. The space current paths of triodes 13 and 23 are in series with each other. The cathode 24 of triode 23 is connected to ground by a capacitor 25 by passed by a switch 26. A resistor 27 connects the cathode 24 to the control grid 28 of the triode 23.

The junction between the control grid 28 and resistor 27 is conected to the anode side of a diode 29. The cathode side of diode 29 is connected to the junction between a pair of serially-connected resistors 30 and 31 forming a voltage divider. The resistors 30 and 31 are connected between ground and the B+ supply voltage terminal 18 for applying a voltage to the cathode side of diode 29 that establishes a reverse bias across the diode. It is assumed that the B+ supply voltage is constant. If not, some means should be used for stabilizing the voltage across resistor 31.

A lead 36 is connected to the anode 22 of triode 23 for supplying a trigger voltage to a device to be fired. This device might be a thyratron 37, for example, whose control grid is connected to lead 36. The firing potential of such a device is variable and occurs anywhere within a zone of firing potentials. This is illustrated in FIG. 2, together with a set of trigger voltage waveforms appearing at lead 36. Each waveform in FIG. 2 is generated in response to the opening of switch 26, assuming that switches 15 and 21 were open. The different waveforms are responses for D.-C. input signals of various magnitudes stored by capacitor 20.

The operation of the system will now be described. Assume that the switches 15, 21 and 26 are all closed and that a variable D.-C. voltage signal of positive polarity relative to ground is applied to the input terminal 11. The voltage across capacitor 20 equals that of the input signal. Since the lower terminal of capacitor 20 is connected directly to ground by switch 21, the voltage across capacitor 20 rapidly follows any variations in magnitude of the input signal. This is based on the assumption that the source providing the D.-C. voltage signal has a relatively low output impedance.

When switch 15 is opened, the voltage stored by capacitor 20 remains substantially equal to that of the D.-C. input signal present at the terminals 11 and 12 at the moment switch 15 was opened. When switch 21 is opened, the current passing through triode 13 flows to ground through triode 23 and switch 26, rather than through switch 21. The magnitude of this current is a direct function of the voltage signal stored by capacitor 20. It is assumed that thyratron 37 has a relatively high input impedance so as to draw only a negligible amount of this current and not affect the charging rate of capacitor 25.

If switch 26 is subsequently opened, the current flowing through triodes 13 and 23 charges capacitor 25 at a rate determined by the signal stored by capacitor 20. The consequent rise in voltage at the anode of triode 23 is fed back to the control grid of triode 13 by capacitor 20. This changes the voltage between the grid and cathode of triode 13 in such a way that the current is maintained substantially constant, at least for the time interval required for the voltage across capacitor 25 to rise to a predetermined value equal to the reverse bias across diode 29. Since a substantially constant charging current is maintained, the voltage across capacitor 25 rises along a substantially linear slope.

The rate at which the voltage rises across capacitor 25 is a direct function of the magnitude of the charging current. Thus, the time required for the voltage across capacitor 25 to rise to the required potential for overcoming the reverse bias across diode 29 is an inverse function of the magnitude of the D.-C. signal stored by capacitor 20.

When the reverse bias across diode 29 is overcome, current flows through resistor 27, thereby biasing triode 23 to cutoff. When this occurs, current flowing in the circuit is substantially cutoff and the voltage at the anode of triode 23 rises abruptly, as illustrated in FIG. 2. This abrupt rise in voltage occurs precisely at the end of a certain time interval T following the opening of switch 26, this time interval being an accurate function of the magnitude of the D.-C. input signal stored by capacitor 20. If this abrupt rise in voltage passes through the firing zone of the thyratron 37 as is illustrated in FIG. 2, the thyratron will be triggered precisely at the end of the aforementioned time interval.

Although the switch 21 has been illustrated as being ganged to switch 15, it could instead be ganged to switch 26. Switch 21 could even be opened independently at any time between the moments switches 15 and 26 are opened.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A waveform generating circuit comprising an electron device having an anode, a cathode, and a control electrode, a source of current, means for supplying a desired amount of current from said source to said anode via a resistive element at a desired time, a current receiving means, a capacitor connected between said cathode and said receiving means, a resistor connected between said cathode and said control electrode, a diode having a predetermined voltage less than said source and greater than said receiving means applied to its cathode side, said diode having its anode side connected to said control electrode, and an output terminal connected between said anode and said resistive element.

2. The combination as set forth in claim 1 wherein said means for supplying a desired amount of current includes another electron device having a cathode, an anode and a control electrode, means for connecting the anode of said other electron device to said source of current, means for connecting the cathode of said other electron device to the anode of the first-mentioned electron device via said resistive element, and a further capacitor connected between the control electrode and the cathode of the other electron device.

3. A timing circuit for controlling the application of a high voltage source, said circuit comprising first and second electron devices, each of said devices having a cathode, an anode and a control electrode, a means for connecting the cathode of said first device and the anode of said second device, a first capacitor connected between the cathode of said second device and ground, a second resistor connected between the cathode and control electrode of said second device, a diode having its anode connected to the control electrode of said second device, means for applying a bias potential less than the potential of said high voltage source to the cathode side of said diode, a second capacitor connected between the control electrode of said first device and the end of the first resistor farthest from the cathode of said first device, means for applying current from said high voltage source via said electron device to said first capacitor, and an output terminal connected between said first resistor and the anode of said second electron device.

4. A circuit as set forth in claim 3 wherein said current applying means consists of a switch across said first capacitor.

5. In a trigger voltage generating circuit, the combination of a capacitor, first means for supplying a charging current via a resistive element to said capacitor, said first means including a source of charging current and means in the path of said charging current for controlling the magnitude of said charging current, a diode connected in parallel with said capacitor, the anode side of said diode being connected to the source side of said capacitor, means for establishing a reverse voltage bias of prescribed magnitude upon said diode, switching means in the path of said charging current, said switching means operative to cut off said charging current in response to the flow of current through said diode, and an output terminal in the path of said charging current between said resistive element and said switching means.

6. The combination as set forth in claim 5 wherein said switching means includes an electron device having a control electrode, resistive means connecting the anode of said diode to the source side of said capacitor and means connecting the anode of said diode to said control electrode.

7. The combination as set forth in claim 6, wherein said first means includes a further electron device in the path for charging said capacitor, said further electron device having a control electrode for controlling the magnitude of the charging current as a function of the magnitude of an input signal.

8. The combination as set forth in claim 7, wherein each of said electron devices includes an anode and a cathode, and means connecting the cathode of one device to the anode of the other device.

9. The combination as set forth in claim 8, wherein said first-mentioned electron device is between said capacitor and said further electron device.

10. In combination, first and second electron devices, each of said devices having a cathode, an anode and a control electrode, means connecting the cathode of said first device to the anode of said second device, a capacitor having one side connected to the cathode of said second device, means including a source of charging current connected between the other side of said capacitor and the anode of said first device, said capacitor being adapted to be charged by a current flowing through said devices, a resistor connected between the cathode and control electrode of said second device, means for applying a voltage signal to the control electrode of said first device for controlling the magnitude of the charging current, a diode having its anode connected to the control electrode of said second electron device and means for applying a reverse voltage bias less than the magnitude of said source between the cathode of said diode and said other side of said capacitor.

11. The combination as set forth in claim 10, wherein a further capacitor is connected between the control electrode and the cathode of said first device for maintaining a constant voltage between said electrode and said cathode for controlling the magnitude of the charging current.

12. The combination as set forth in claim 11, wherein said means connecting the cathode of said first device to the anode of said second device comprises a further resistor, one side of said further capacitor being connected to the end of said further resistor at the anode of said second device, the other side of said further capacitor being connected to the control electrode of said first device.

References Cited in the file of this patent

UNITED STATES PATENTS

| | | |
|---|---|---|
| Re. 24,204 | Coulter | Aug. 28, 1956 |
| 2,556,692 | Holdaway | June 12, 1951 |
| 2,627,576 | Howarth | Feb. 3, 1953 |
| 2,661,398 | Cooper et al. | Dec. 1, 1953 |
| 2,756,378 | Scott | July 24, 1956 |
| 2,758,205 | Lubkin | Aug. 7, 1956 |
| 2,821,626 | Freedman | Jan. 28, 1958 |
| 2,830,133 | Ranks | Apr. 8, 1958 |
| 2,839,704 | Schlang | June 17, 1958 |
| 2,882,400 | Zeidler | Apr. 14, 1959 |